Dec. 16, 1969  R. W. HODGSON ET AL  3,484,679
ELECTRICAL APPARATUS FOR CHANGING THE EFFECTIVE
CAPACITANCE OF A CABLE
Filed Oct. 3, 1966  5 Sheets-Sheet 1
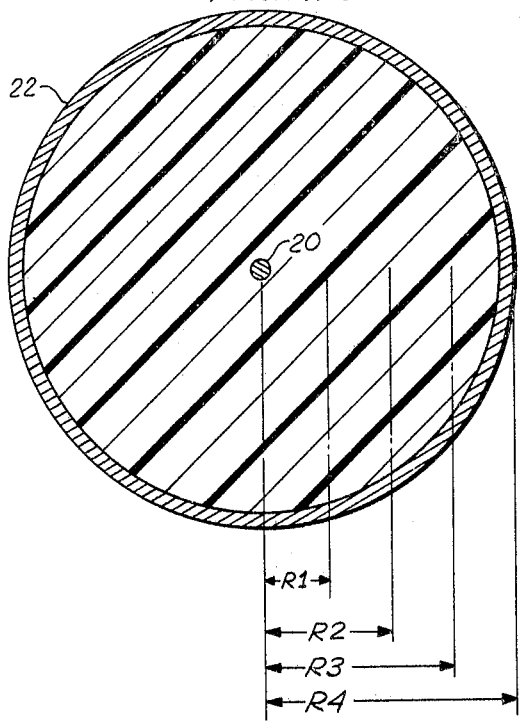
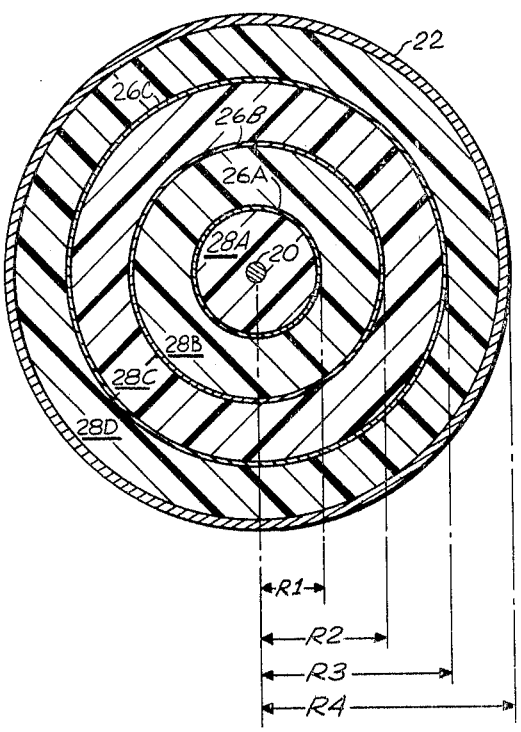
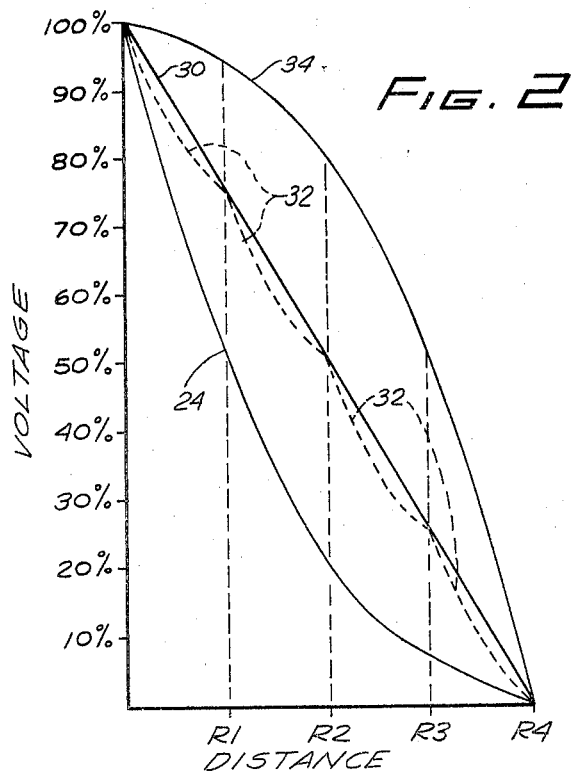
INVENTORS
RICHARD W. HODGSON
CHARLES T. POARCH
CLIFFORD F. KENNEDY
BY
Sidney Magner INVENTORS
RICHARD W. HODGSON
CHARLES T. POARCH
BY CLIFFORD F. KENNEDY
Sidney Magnes

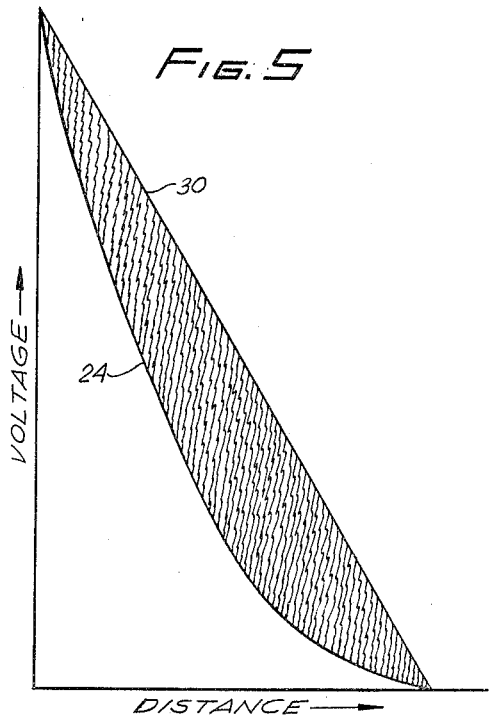
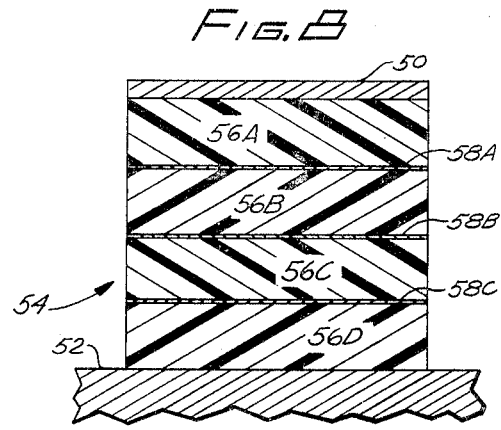
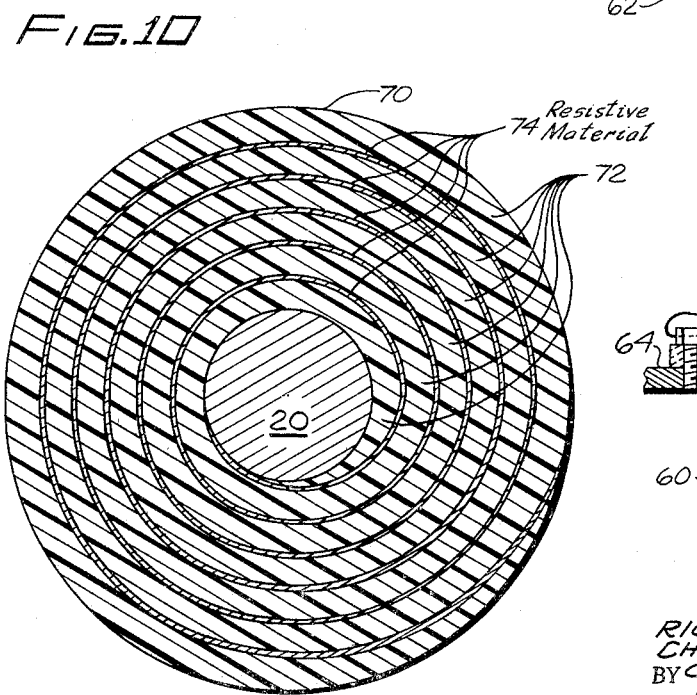
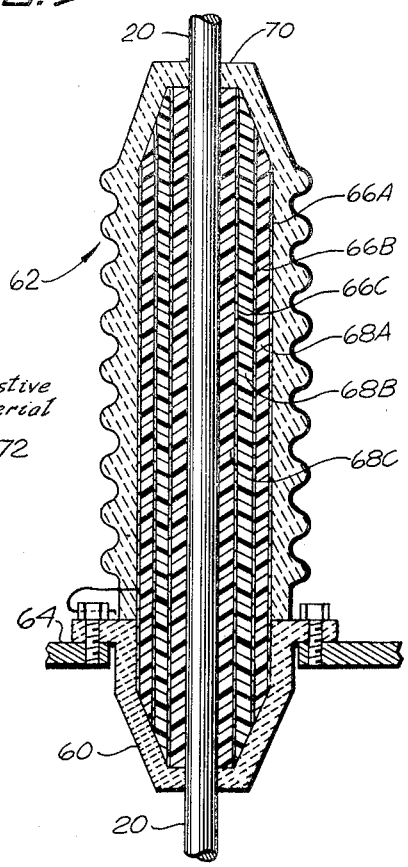
INVENTORS
RICHARD W. HODGSON
CHARLES T. POARCH
BY CLIFFORD F. KENNEDY

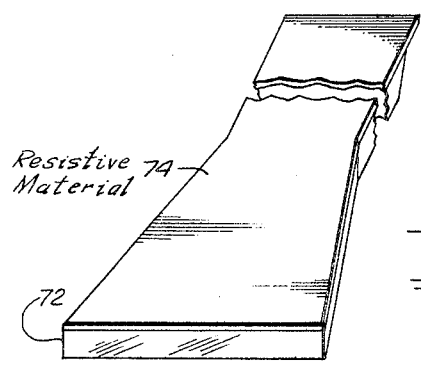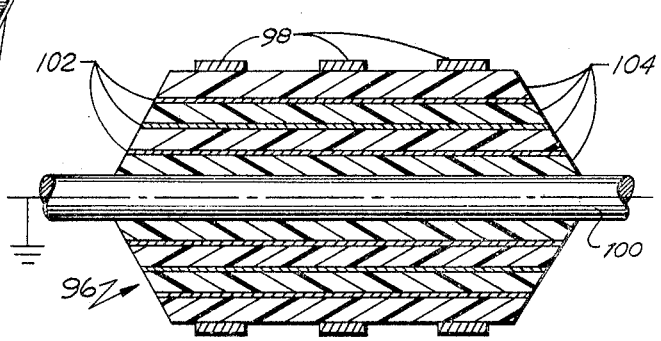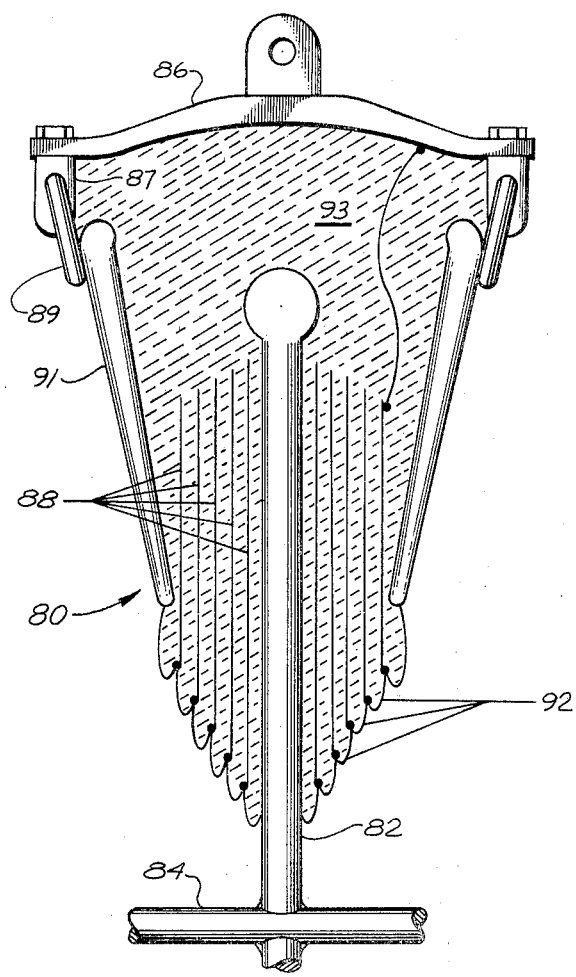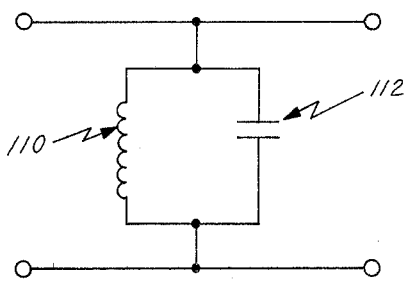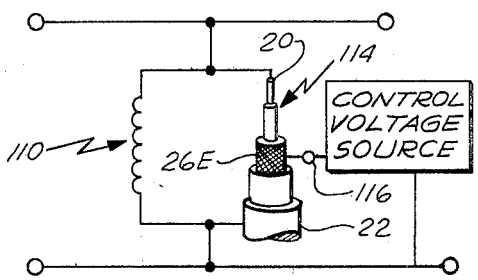

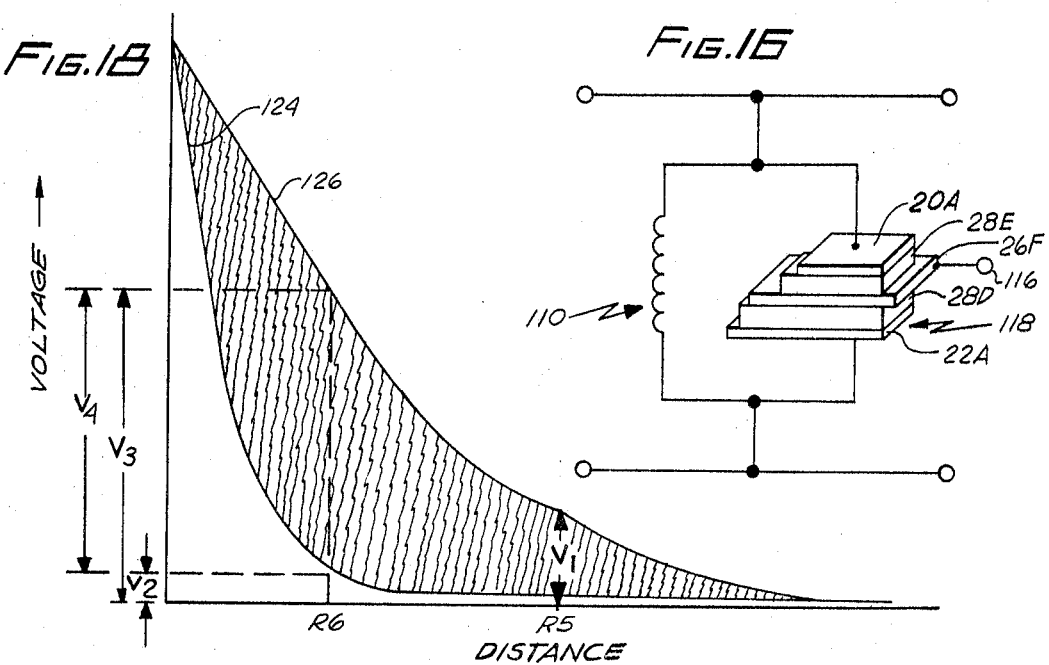
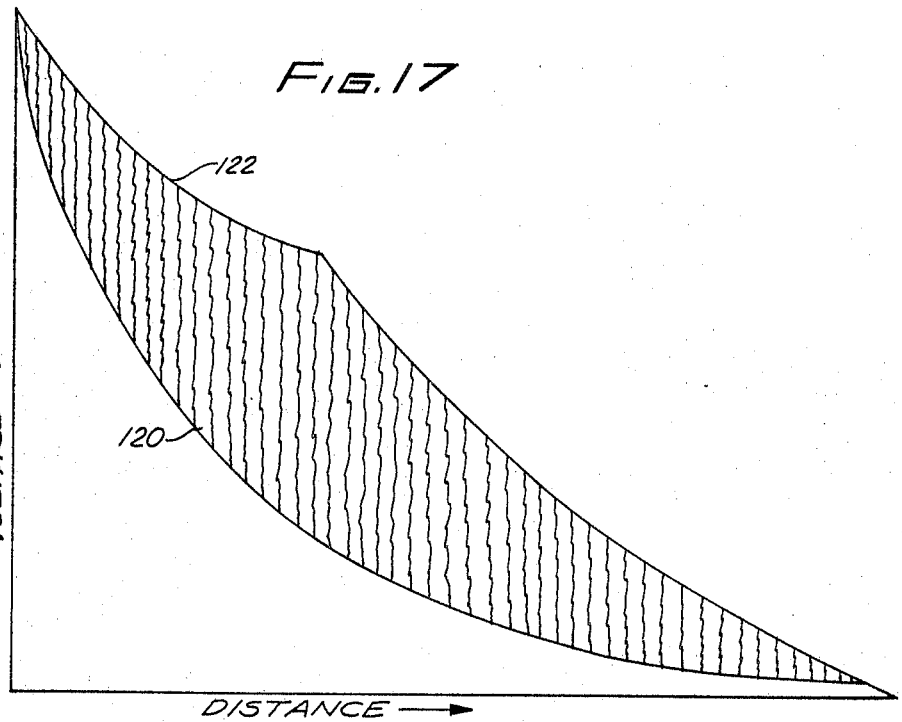

United States Patent Office 3,484,679
Patented Dec. 16, 1969

3,484,679
ELECTRICAL APPARATUS FOR CHANGING THE EFFECTIVE CAPACITANCE OF A CABLE
Richard W. Hodgson, Sepulveda, Clifford F. Kennedy, Simi, and Charles T. Poarch, Granada Hills, Calif., assignors to North American Rockwell Corporation, a corporation of Delaware
Filed Oct. 3, 1966, Ser. No. 583,531
Int. Cl. G05f 1/68
U.S. Cl. 323—105          3 Claims

ABSTRACT OF THE DISCLOSURE

This invention relates to electrical apparatus; and more particularly to a structure that (1) minimizes the breakdown of materials exposed to a high electrical voltage, (2) provides an improved transmission-cable, (3) provides a novel electronic component, and (4) permits the control of a power-line's power-factor. In general, the disclosure teaches structures that contain interleaved layers of electrically-conductive and electrically-insulative materials; the electrically-conductive materials being connected to voltage-sources. The voltage-gradient across the insulative-layers may be varied, and the effective-capacitance may be changed—the latter effect being useful for testing, amplification, power-factor control, and the like.

OBJECTS AND DRAWINGS

It is an object of the present invention to provide an improved electrical-power transmission cable.

It is another object of the present invention to provide a structure that controls the voltage-gradient of an electric field.

It is a further object of the present invention to provide an improved insulating structure.

It is still another object of the present invention to provide a voltage-gradient control structure that minimizes the electrical breakdown of an insulating material.

It is a still further object of the present invention to provide a novel electronic component.

The attainment of these objects and others will be realized from the teachings of the following specification, taken in conjunction with the drawings, of which FIGURE 1 shows a cross section of a shielded cable;

FIGURE 2 shows a voltage-gradient curve associated with the invention;

FIGURE 3 shows a schematic illustration of one embodiment of the invention;

FIGURE 5 shows another voltage-gradient curve associated with the invention;

FIGURE 8 shows a standoff embodiment of the invention;

FIGURE 9 shows a bushing embodiment of the invention;

FIGURES 10 and 11 show a modification of the basic inventive concept;

FIGURE 12 shows a support embodiment of the invention;

FIGURE 13 shows an armature embodiment of the invention;

Figure 4:
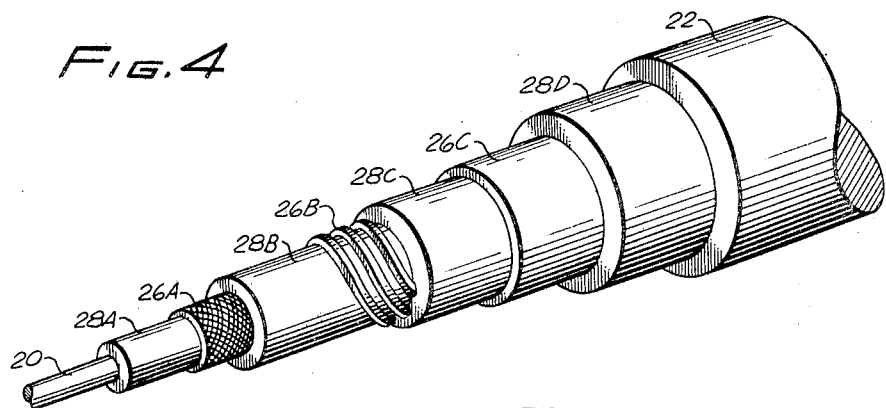
FIGURE 4 shows a pictorial view of a cable embodiment of the invention.

FIGURES 14, 15, and 16 show how the invention is used as a variable capacitor; and FIGURES 17 and 18 show curves, depicting various energy relations of the variable-capacitor embodiment.

SYNOPSIS

Broadly speaking, the present inventive concepts comprise structures that contain interleaved layers of electrically-conductive material and electrically-insulative material. The layers of electrically conductive material have predetermined voltages applied to them; these predetermined voltages introducing a number of desirable characteristics.

One embodiment comprises an electrical power cable having a plurality of coaxial electrically-conductive and electrically-insulative tubular structures that alternate in a radial direction. In use, voltages are applied to the electrically-conductive structures. Depending upon the applied voltages, the power cable can then handle larger voltages, use lower-rated insulation, or adjust the capacitive load of a power station. Another embodiment comprises electrical standoffs or bushings, either in block or cylindrical form, wherein the alternating structures and applied voltages minimize electrical breakdown and flashover. In the cylindrical form, a variation replaces the alternating structures with a spirally-wound sheet of electrically-resistive material. Still another embodiment uses the alternating structure as an electronic component, by applying a control voltage to the electrically-conductive structure.

As will become apparent as the description proceeds, the inventive concept may be embodied in many different types of electrical devices in which potential gradients exist. The invention will be more fully described in connection with a cable, a standoff, a bushing, and an electronic component; and still other applications will be readily apparent to those skilled in the art.

BACKGROUND-CABLE

It is well known that electricity is usually generated at one location, and is then transmitted over wires to other locations where the electricity is used. It has been learned that the transmission of electrical power becomes more efficient as the voltage is increased; and the overhead wires that transmit the electrical power frequently have a voltage as high as 500,000 volts. It would be desirable to use even higher voltages; but, as will be understood from the following discussion, higher voltages introduce the problem of electrical breakdown of insulating materials.

A relatively new—and somewhat surprising—innovation is the realization that the transmission of electrical power over long distances would be more efficient if D.C. (Direct Current) were used, rather than A.C. (Alternating Current). This arises, in part, from the fact that the disadvantages of A.C. power transmission result from the "peak" A.C. voltages; whereas the power depends upon the lower "root-mean-square" (RMS) voltage. In D.C. power transmission, the RMS and peak voltages are identical, thus minimizing the disadvantage. A prior-art limitation of high-voltage D.C. power transmission was the difficulty of converting D.C. to A.C.; but this limitation is being removed by new equipment such as is described in "Long-Distance Power Transmission" by Uno Lamm, International Science and Technology, April 1966.

Thus, it is becoming increasingly desirable to use high voltages; but, as will be understood from the following discussion, most present-day electrical cables cannot handle higher voltages.

As indicated above, at present most electrical power is transmitted along overhead wires; and in order to minimize structural and weight problems, these overhead high-voltage wires are generally uninsulated wires that are suspended from, or supported on, towers—by means of insulative supports. However, due primarily to the rapid expansion of populated areas, it is becoming increasingly dangerous to use such overhead high-voltage wires; since the danger of breakage endangers the areas beneath them. As a result, increasing attention is being given to burying these high-voltage wires under ground, or—in some cases —under water. However, in order to safely bury these high-voltage wires, it becomes necessary to surround the high-voltage wire with an external covering, so that if the wire or associated structure were accidently touched by a person or equipment, there would be no danger from the high-voltage wire. The external covering is ordinarily an electrically-conductive sheath that is at a low voltage, or so-called "ground" potential.

When using such a sheath, it becomes necessary to insulate and space the internal high-voltage wire from the external low-voltage sheath; and this is accomplished by placing insulating material around the wire, i.e., between the wire and the sheath. This arrangement is known as a "sheathed" or a "shielded" cable, the wire and the sheath being concentric and coaxial. As will be shown later, there is an electric "field" between the high-voltage wire and the low-voltage sheath; and this electric field has a particular manner, or "gradient," in which it decreases from a high to a low voltage. It should be noted that the voltage-gradient determines the manner in which the insulative material is exposed to high-voltage; and the electrical breakdown of the insulative material is one of the factors that limits the magnitude of the voltage that may be placed upon the high-voltage wire.

This situation will be more clearly understood from FIGURE 1, which represents the cross-section of an electric-current-carrying sheathed-cable. The actual current-carrying wire is indicated by reference character 20; and a metallic sheath 22 is spaced from wire 20 by some convenient means, usually insulative material positioned between wire 20 and sheath 22.

It is known that if wire 20 is at a high electrical voltage, and if sheath 22 is at a low electrical voltage, the electric field between these two elements is a convergent one that is primarily determined by the radius of the wire 20 and the space between wire 20 and sheath 22; the electric field producing a voltage-gradient as shown by curve 24 of FIGURE 2. Because of its spatial position in the electric field, a point at a distance R1 of FIGURE 1 assumes a voltage of about 60% of the maximum; a point at a distance R2 assumes a voltage of about 20% of the maximum; a point at a distance R3 assumes a voltage of about 8% of the maximum; and a point at a distance R4 has a voltage of zero; these assumed voltages being designated as "normal" voltages for reasons to be discussed later.

Because of the circular cross section of the wire, and the annular configuration of the sheath, the convergent electric field causes curve 24 of FIGURE 2 to be of the type known as "logarithmic"; other types of electric fields producing voltage-gradient curves of different shapes. It should be noted that curve 24 indicates the voltage at various points in the electric field; and that the slope of curve 24 indicates the voltage-gradient at these points—a steep gradient being a very severe and undesirable condition for the insulating material.

It follows from the discussion of FIGURES 1 and 2 that an insulative material at a distance R1 is exposed to a steep voltage gradient; and this means that there is a large voltage across a small volume of the electrically insulative material. In order to be a satisfactory electrical insulator, the material must be able to withstand this voltage gradient without breaking down. It may be seen from FIGURE 2, that the portions of the insulator material closer to wire 20 must withstand progressively higher voltage-gradients; and that the material further from wire 20 has to withstand progressively smaller voltage-gradient, as indicated by the slope of curve 24 in FIGURE 2.

Another problem is superposed upon the voltage-gradient problem discussed above; this problem being "discontinuities" or "inclusions" in the insulator material. Ordinarily, these discontinuities act in such a manner as to increase the voltage-gradient over a small area of the insulator material; thus accentuating the voltage-gradient, so that it is frequently two or three times as high as the normal voltage-gradient. As a result, many insulative materials break down electrically under the accentuated voltage-gradient; frequently being converted to a carbonaceous material that is a semi-conductor, rather than an insulator. As sooon as this semi-conductor is formed, it distorts the electric field; and causes an even more accentuated voltage-gradient. As a result, adjacent insulator material is exposed to the higher voltage-gradient, and it tends to break down. As may be realized, this effect is cumulative; and once a breakdown is initiated, it tends to progress very rapidly. Eventually, the insulative material breaks down to form a continuous semi-conductive path between the wire and the external sheath; and, because of this "catastrophic" breakdown, the high-voltage cable is then useless.

DESCRIPTION, CABLE

A high-voltage cable embodiment of the invention is shown in FIGURE 3. This cross-sectional illustration shows the previousy discussed wire 20 and outer sheath 22; but has, in addition, a plurality of electrically-conductive elements 26A, 26B, 26C, etc.; only three such conductive elements being shown. The spaces between the conductive materials 20, 26A, 26B, 26C are filled with the usual insulator material 28A, 28B, 28C and 28D of the type used in prior-art high-voltage cables; thus forming an interleaved voltage-gradient structure. Each conductive element 26A, 26B, and 26C has means (not shown) for applying an electric voltage to it.

It will be seen that elements 26A, 26B, and 26C are positioned at distances R1, R2, and R3; corresponding to the illustration of FIGURE 1. Therefore—in accordance with the discussion of FIGURES 1 and 2—conductive elements 26A, 26B, and 26C will assume their particular "normal" voltages in accordance with the previous discussion of the voltage-gradient curve 24 of FIGURE 2.

In accordance with the teachings of one embodiment of the present invention, however, elements 26A, 26B, and 26C are maintained at their normal voltages corresponding to their positions in the electric field. These voltages are obtained by connecting the elements 26A, 26B, etc. to an external invariant voltage such as is available from a power supply or power station; the obtaining of these voltages being discussed in connection with subsequently discused FIGURES 6 and 7.

Maintaining these normal vo'tages has the following advantages. Assume that in a prior-art sheathed cable, a portion of the insulator material adjacent wire 20 has an electrical breakdown as discussed previously producing a short semi-conductive path. This, in turn, produces a new electric field, having an intensified voltage-gradient. Adjacent portions of the insulator are therefore exposed to a higher voltage-gradient; until a semi-conductive path is produced between wire 20 and a sheath 22—thus producing a catastrophic breakdown. However, in accordance with the present invention, elements 26A, 26B, and 26C of conductive material are maintained at their original normal voltages, independent of the new electric field; and thus the conductive elements 26A, 26B, and 26C maintain the normal voltage-gradient in the portion of the insulation that has not undergone electrical breakdown. Therefore, electricity may leak over the short semi-conducive path; but the rest of the insulative material continues to be exposed to its normal voltage-gradient, rather than to the intensified voltage-gradient. Therefore, the cable wi l not be destroyed, and may still be used. In this way, by maintaining the conductive elements at predetermined voltages—in accordance with the present invention concept—the possibility of cable failure is minimized, or even eliminated. Thus, cable using the disclosed inventive concept may be safely used for higher voltages than previously, without danger of catastrophic breakdown; or, alternatively, places less stringent demands on the insulative material.

The above breakdown-limiting operation of the disclosed invention has a useful ancilliary result; namely, an inherent self-testing of the cable. It is obvious that if the cable-insulation were perfect, there would not be any electric leakage-current; but if there were a semiconductive breakdown path, a large leakage current would flow. This leakage-current is supplied by the power source that maintains the normal voltage on conductor 26A. Therefore, by monitoring the leakage-current to conductor 26A, an indication is provided of the condition of the insulator. Similarly, monitoring the leakage-current to the other conductors provides an indication of the condition of the other portions of the insulation. In this way, by monitoring the leakage-currents, the cable inherently provides a self-testing characteristic that indicates the instantaneous state of the insulation; and thus warns of impending insulation and cable breakdown.

Referring back to FIGURE 2, it was stated that curve 24 indicated the voltage and voltage-gradients at various points in the insulative material position between the wire and the outer sheath. As indicated previously, the slope of curve 24 is an indication of the voltage-gradient; the steeper the curve, the more intense the voltage-gradient. It may thus be seen that the voltage-gradient is steepest adjacent wire 20; which means that the possibility of insulation breakdown is greatest near the wire, rather than near the external sheath. Therefore an insulation must be selected to withstand the most intense voltage-gradient, even though most of the insulation is not exposed to this intense voltage-gradient.

If the voltage-gradient curve 24 of FIGURE 2 could be reshaped so that it has a uniform slope—i.e., is "linear"—at all portions thereof, as indicated by curve 30, this would mean that all parts of the insulative material are subjected to a smaller, identical voltage-gradient; and therefore, (1) no part of the insulation would be more liable to breakdown than any other part; and (2) a lower-breakdown insulator material may be used. Alternatively, the original insulator-material will permit the use of a higher-voltage on the central wires.

Figure 6:
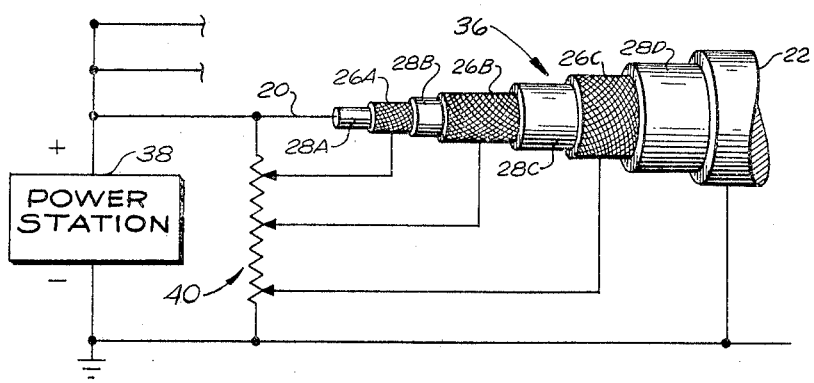
FIGURES 6 and 7 show the cable embodiment used for load-control purposes.
Figure 7:
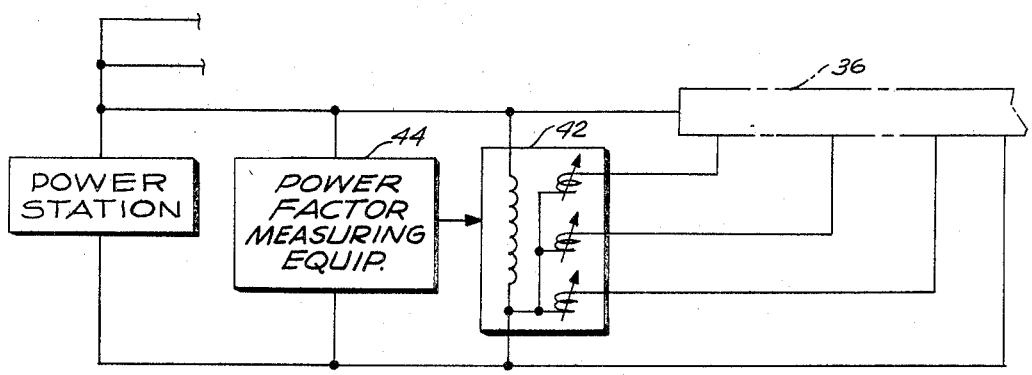

This linearization may be approximated—within the use of the arrangements shown in FIGURE 6 or FIGURE 7—by connecting conductive element 26A to a voltage that is 75% of the maximum; connecting element 26B to a voltage that is 50% of the maximum; and connecting element 26C to a voltage that is 25% of the maximum. In this way, the actual voltage-gradient would be more linear, as represented by curves 32 of FIGURE 2. Obviously, an infinite number of elements 26A, 26B, 26C, etc., at suitable voltages would approach the idealized linear condition. The voltages may also be supplied to the elements by a separate and distinct power source.

Under some conditions, it may be desirable to produce the voltage-gradient curve 34 of FIGURE 2. This curve has the advantage that the voltage-gradient is relatively small (curve 34 is almost horizontal) near the conductor, where there is a small volume of insulation; and becomes much more intense (curve 34 is quite steep near the external sheath) where there is a large volume of insulation. It should be noted that curve 34 is readily approximated by applying 95% of the maximum voltage to conductor 26A, applying 80% of the maximum voltage to element 26B, and applying 50% of the voltage to element 26C. Other voltage-gradient curves may be produced in a similar manner.

It will be realized that voltage-gradient curves such as 30, 32, and 34 are "abnormal" in the sense that they are produced by applying abnormal voltages to conductive elements, thus producing an abnormal electric field. As will be shown later, the production of these abnormal voltages, fields, and gradients has a number of novel uses and advantages.

It should be noted that if the normal voltages were maintained, no current flow between the voltage-gradient control elements 26 and the external applied invariant voltage sources; but if abnormal voltages were maintained, an appreciable current would flow between the control elements and the externally applied voltage sources.

It may thus be seen that by establishing predetermined voltages at voltage-gradient-control elements such as 26A, 26B, and 26C, the voltage-gradient, or electric field, can be controlled in a desired manner. The desideratum may be the producing of a uniform voltage-gradient, minimizing the flow of electrical current through the insulative material, or obtaining desired cable characteristics.

FIGURE 4 illustrates a high-voltage cable comprising the disclosed gradient-control structure. Here wire 20 is surrounded by a tubular insulator 28A that in turn is surrounded by a voltage-gradient-control element 26A, shown as a braid which is well known in the art. Tubular insulator 28B surrounds the braid, and is in turn enclosed in a second voltage-gradient-control element 26B, this being shown as a helically wound strip of metal. The next tubular insulator 28C is in turn surrounded by a third voltage-gradient-control element 26C which is shown as a metallic film deposited onto the preceding insulator. Final insulator 28D is enclosed in sheath 22.

The various types of electrically-conductive elements may be formed as desired, or as required, by the particular cable. For example, the braid may be woven on the insulation in the usual manner; the helical structure may be wrapped around the insulation in the way known to those in the art; and the metallic film may be either deposited, or extruded, onto the wire as the cable is made. Of course, fewer or more numerous voltage-gradient-control elements may be used; and other types than those illustrated may be applied to the cable. In any case, electrically-conductive elements and the electrically-insulative elements are contiguous, and alternate in their sequence. FIGURE 4 is merely illustrative of how a cable may be formed, not necessarily using the three types of gradient-control elements shown.

The inventive concept, as discussed above, applies to both direct current (D.C.) and alternating current (A.C.), but provides additional advantages when used with alternating current; and these may be understood from the following discussion. When an A.C. power station provides eelctrical power to a transmission cable, the type of electrical loads have a great effect. For example, most electrical loads—such as motors, transformers, etc.—produce an "inductive" load; whereas a very few electrical loads produce a "capacitive" load. Ideally, from the point of view of the power station, the inductive load should equal the capacitive load—this condition being known as a "unity power factor," or as a "critically loaded line" condition. In order to approach this ideal condition, present-day power stations connect external capacitors to the transmission line; these capacitors being large, expensive, and ordinarily of fixed values. In order to maintain a unity-power-factor condition, the power station has devices that continuously monitor the instantaneous power-factor, and continuously connect and disconnect the external capacitors in an attempt to maintain unity power factor. This arrangement, besides being expensive, is not completely satisfactory.

The disclosed cable provides a capactive power factor correction as follows. Referring to FIGURE 5 which, like FIGURE 2 is a curve of voltage vs. distance, it is known to those in the art that the area under curve 24 corresponds to the energy stored in the cable under normal conditions; and that the area under an abnormal curve such as 30, corresponds to the energy stored in the cable under abnormal conditions as discussed previously. Therefore, the hatched area between curves 24 and 30 corresponds to additional energy supplied to the cable under abnormal conditions.

It will also be realized that the spaced apart electrically-conductive voltage-gradient-control elements 26A, 26B, 26C, etc., form a series of capacitors having natural capacitive values that depend primarily on their spacing and the insulative material between them. However, by changing the voltages applied to these elements, the amount of capacitive energy stored by these capacitors may be changed; and they thus act as capacitive loads for the power station. The capacitive loading of the transmission line can thus be changed to adjust the capacitive load on the power station, and to thus provide a unity-power-factor condition. This control of the effective capacitive load has the advantage over external capacitors in that no additional components are involved; that control is smoothly continuous, rather than requiring the connecting and disconnecting of external fixed-value capacitors; and that the stored capacitive energy is evenly distributed along the entire length of the transmission cable, rather than being lumped at the specific location of the external capacitors.

FIGURE 6 shows one way of providing the desired adjustable capacitive load; power station 38 having a plurality of power cables connected in a well-known manner, such as a delta configuration. In FIGURE 6, one high-voltage cable 36 is shown; its gradient-control conductors having predetermined voltages applied to them by means of a voltage-divider 40, adjustable taps permitting each predetermined voltage to be individually adjustable. The inherent operation of voltage-divider 40 is such that in cases of voltage surges, the voltage-gradient change is proportioned among the various voltage-gradient-control elements 26. This arrangement minimizes the intensification of localized voltage-gradients during surge or transient conditions. In order to provide the power-factor control discussed above, the various taps are adjusted—either manually, or through automatic power-factor meters and suitable motors—so that the capacitive load of cable 36 is varied. In this way, the power line is continuously maintained at its critically-loaded condition.

FIGURE 7 shows another way of providing the desired capacitive load. Here the individual predetermined voltages are obtained from a transformer 42, whose secondary outputs are obtained from adjustable transformers—such as Variacs (manufactured by General Radio Company); these in turn being controlled by a power-factor measuring device 44. Thus the predetermined voltages are varied in such a manner as to obtain the desired unity power factor condition.

Thus, the disclosed inventive concept provides a number of transmission cable advantages. Firstly, it provides optimum voltage-gradients; and thus permits the use of higher voltages, lower-valued insulation, minimized cable-breakdown and minimized leakage current. Secondly, it provides insulation-condition information. Thirdly, the disclosed inventive concept permits a transmission cable to have a controllable capacitive load; and thus permits adjustment and maintenance of unity-power-factor conditions.

DESCRIPTION, INSULATORS

There are frequently instances where a transmission cable, a plate, or a structure that is at a high electrical voltage must be supported on a member that is at a low electrical voltage; and FIGURE 8 shows a "standoff," employing a voltage-gradient control-structure, that may be used for this purpose. Here plate 50 is at a high electrical voltage, and base member 52 is at a low voltage. Voltage-gradient control structure 54, in accordance with the teachings of the present invention, comprises interleaved contiguous insulative layers 56A, 56B, 56C, and 56D, and electrically-conductive voltage-gradient-control elements 58A, 58B, and 58C. As discussed previously, the gradient-control elements are connected to a suitable voltage-divider or transformer to maintain the voltage on them in accordance with the previously discussed principles. In this way, the high-voltage plate 50 is electrically isolated from low-voltage base 52; and the voltage-gradient control structure 54 establishes a voltage-gradient that protects the insulating material from electrical breakdown.

There are times when a high-voltage wire must pass through a metal plate that is at low voltage; this problem occurring when wires must pass in or out of transformers, cabinets, and the like. It should be noted that in cases like this, a catastrophic insulation breakdown frequently produces an appreciable explosion that spews hot gases, liquids, and metals over an appreciable area; and makes a shambles of the equipment.

FIGURE 9 shows an arrangement wherein the disclosed concept is used to provide an improved feed-through "bushing" 62. Here, high-voltage wire 20 is required to pass through a low-voltage metal plate 64, and—as previously described—it is necessary to provide insulation and spacing between the high-voltage wire and the low-voltage plate. The insulation may be a plastic, a ceramic, or any other suitable material. The insulating arrangement may be a voltage-gradient control structure as previously disclosed, except that in this case it may take a different form, as shown in FIGURE 9. Here the cross-sectional view shows previously described voltage-gradient control elements 66A, 66B, and 66C alternating with a plurality of insulative layers 68A, 68B, 68C. The control elements are connected to predetermined voltages, as discussed previously in order to provide insulative-material voltage-gradient control; and the entire assembly is enclosed in a shell 70 that may comprise epoxy, glass, ceramic, or some other suitable material.

It should be noted in passing that there is an ever-present danger of "flashover"; that is, the possibility of an electrical leakage-current between the emerging ends of high-voltage wire 20 and the low-voltage plate 64. If this leakage-current is small, it can be tolerated; but if the leakage current becomes large, of if an arc forms, appreciable damage may result. FIGURE 9 shows the central portion of shell 70 to be corrugated; the corrugation providing a long leakage path. In prior-art devices, corrugations were used to produce a long leakage-path between low-voltage plate 64 and the emerging end of high-voltage wire 20. However, dust and other contaminants tend to settle on the corrugated surface; and these contaminants act in the same manner as the previously-discussed discontinuities and inclusions, and produce localized steep voltage-gradients. These, in turn, produce localized flashovers, which in turn, produce intensified, steep voltage-gradients. As a result, the cumulative contaminant action reduces the long leakage-path electrical resistance, and so leads to a flashover. The one satisfactory way to prevent these prior-art flashovers has been to periodically wash off the accumulated contaminants.

The end-portions of FIGURE 9 show how the present inventive concept may be used to minimize end flashover. As shown, the voltage-gradient-control elements terminate just inside a thin ceramic caps 60 and 70; and, as a result, the adjacent ends of the electrically-conductive elements provide controlled voltage-gradients that tend to appear at the outer surfaces of caps 60 and 70. These caps protect the gradient-control assembly from the environment, if this is necessary. As previously described in connection with the minimizing of insulation breakdown, the voltage-gradients are maintained on the outer cap surfaces; so that localized flashovers are prevented from becoming a cumulative catastrophic flashover. It should also be noted that the ends of bushing 62 are tapered rather than being an abrupt termination. This tapering produces a larger physical spacing between the ends of the control elements; and thus introduces a larger amount of insulation between the ends of control elements—this larger volume also tending to minimize local flashover. A bushing constructed in accordance with the present teachings would have both ends tapered and constructed as shown.

The voltage-gradient structure of FIGURE 9 may, of course, be formed of concentric layers as previously discussed. However, it was previously indicated that a voltage-divider may be used to provide the predetermined voltages for the gradient-control elements; and in FIGURE 10, an internal voltage-divider may be produced and used. FIGURE 11 shows a sheet of flexible insulative material 72 that is coated with a film 74 of electrically resistive material. This sheet is spirally wrapped around wire 20, as shown in FIGURE 10, forming alternate contiguous interleaved layers of insulative material and of conductive material—the latter of which has one end in electrical contact with the high-voltage wire 20, and has its other end electrically contacted in any desirable manner to low-voltage plate 64. With these connections, the coating of electrically-resistive material 74 acts as an internal continuous voltage-divider so that each portion of the resistive element 74 is at a different potential relative to other portions. In this way, a predetermined voltage-gradient curve is obtained.

If desired, the resistive film may be formed in such a way that its thickness is not uniform; this having the effect of producing an abnormal voltage-gradient—of the type indicated by curves 30, 32, and 34 of FIGURE 2, or of any desired intermediate curve. Alternatively, the structure may comprise a plurality of coaxial gradient-control elements, with spiral voltage-dividers of the above type interconnecting adjacent elements.

As indicated previously, most high-voltage power transmission wires are supported by towers; these towers being at ground potential. Since the wires are at a high voltage, it is necessary to support and space them from the tower by means of insulators that can withstand the high voltage and resultant electric field. The electric field determines, to a great extent, the internal construction and material used in making the supports; and the high-voltage determines, to a great extent, the external configuration of the support. In cases such as these, the suspension insulator 80 of FIGURE 12 may be used. This has its lower rod 82 attached to, or otherwise hooked around a high voltage wire 84; and has a metallic upper plate 86 attached to a cross-bar of the tower. Plate 86 has an affixed insulating cylinder 87 that supports a metallic cone 89. Cone 89, in turn, is affixed to a cone-like shell 91—of ceramic, epoxy, glass, or other suitable material—that encloses an insulator body 93, which is formed of an insulating material. Since the structure of FIGURE 12 is to operate under tension loads, support rod 82 is anchored—as by means of a spherical end—inside body 93.

It will be seen that support rod 82 tends to be at high voltage, since it is in proximal vicinity of high-voltage wire 84; and that cover plate 86 tends to be at a low voltage, since it is in proximal vicinity of the low-voltage tower. Therefore, the disclosed voltage-gradient structure may be used.

As shown in FIGURE 12, the voltage-gradient structure may comprise a series of voltage-gradient controllers 88 that are spaced apart in insulative body 93. In this way, the electric field may be controlled to assume any desired voltage-gradient. As previously described, the gradient controllers 88 may be either concentric tubular configurations energized by interposed spiral resistances comprising a voltage divider, or else may be the spiral arrangement discussed in connection with the previous illustration of FIGURE 9.

It will be noted that the lower end of structure 80 has bulbous extruding portions 92 between the ends of adjacent gradient-control elements, in order to provide long leakage paths that further minimize local flashover.

It is well known that electrical generators frequently have their armature shafts connected to a low-voltage, such as ground; and have high voltage windings to which slip-rings are connected. The slip rings ordinarily rotate with the armature, and are contacted by fixedly-positioned brushes. Since the slip-rings are at high-voltages, they must be insulated from the low-voltage shaft. In the past, there has been a constant danger of arcing and insulator breakdown at the slip rings, due to the high voltage-gradient present there. In FIGURE 13, a voltage-gradient control structure 96 is positioned between the low voltage armature shaft 100 and the high voltage slip rings 98, which are connected to the high-voltage windings. As previously described, the gradient controllers 102 are arranged in an interleaved arrangement with insulator layers 104, and connected to suitable potentials, or spirally wound, in order to provide the voltage-gradient control previously discussed.

DESCRIPTION, VOLTAGE CONTROLLED CAPACITOR

It is well known that capacitors are widely used in electric circuits, one such circuit being shown in FIGURE 14. Here an inductor 110 is connected in parallel with a capacitor 112, the combination forming an electrical tuned circuit that is resonant at a frequency determined by the values of inductance and capacitance. In those cases where resonance to a single fixed-frequency is desired, the values of capacitance and inductance are fixed; but in those cases where a resonance to a range of frequencies is desired, either the capacitor or the inductor must have a variable value. Examples of this variable frequency use are variable-frequency oscillators, automatic frequency-control circuits for FM radios, etc.

FIGURE 15 schematically shows an embodiment of the present invention used as an electronic component. Here a length of cable 114, similar to that previously described in connection with FIGURE 4—except that it has only one intermediate conductor 26E—serves as the capacitor in a tuned circuit. Conductor 26E is connected to a terminal 116, which is in turn connected to a source of control voltage; wire 20 and sheath 22 being connected as the capacitive leads of a tuned circuit. With no voltage applied to terminal 116, the capacitance of capacitor 114 depends upon its physical size, spacing, and configuration of the inner wire and the external sheath; on the electrical characteristics of the insulating material; and on the length of the cable. Thus, the quiescent value of cable capacitor 114 may be of any desired value.

In order to vary the resonant frequency, a control voltage is applied to terminal 116, thus changing the apparent capacitive value. As a result of this change, the circuit is now resonant to another frequency. The control voltage may be obtained from an error-voltage source, a phase discriminator, a flip-flop, or any other suitable circuit; and the changed resonance may be used to control an oscillator, the reception of an FM radio, or the like. In this way, the described embodiment may be used in electronic circuits as a voltage-controlled capacitor.

As previously indicated, a cable, such as that shown in FIGURE 15, has a convergent electric field; and the effect of the control voltage is non-linear. Alternatively, for a linear-effect control voltage, the block arrangement 118 shown in cutaway form in FIGURE 16 may be used. Here the block-capacitor 118 comprises alternate contiguous layers of a metallic plate 22A, insulator 28D, metallic film 26F, insulator 28E, and metallic plate 20A. Since the quiescent capacitance of block capacitor 118 depends upon its size, insulators, spacing, etc., block-capacitor may be proportioned for the desired quiescent capacitive value.

If desired, the disclosed concept may use a spherical configuration, as this provides the maximum capacitance in the smallest physical space.

Referring now to FIGURE 17, there is illustrated a normal voltage-gradient curve 120 for the cable arrangement of FIGURE 15. It is known to those skilled in the art, that the area under curve 120 corresponds to the energy stored in the cable-capacitor 114. FIGURE 17 also shows the abnormal voltage-gradient curve 122 that is produced when a control voltage is applied to the control element 26E—or 26F of FIGURE 16; the area under curve 120 corresponding to the energy stored in the cable-capacitor under a normal voltage condition, and the area under curve 122 corresponding to the energy stored in the cable-capacitor under the abnormal voltage condition. Thus, the hatched areas between the curves represents additional energy that may be stored and used when the cable-capacitor 114 of FIG. 15, or the block capacitor 118 of FIG. 16, is used as an electronic component. If this energy is provided through terminal 116 from the same voltage source that supplies cable-capacitor 114, the total capacitive energy drawn from the voltage source in the abnormal voltage condition is larger than in the normal voltage condition. As the capacitor energy storage capability of a capacitor is proportional to its magnitude of capacitance, the increased energy storage provided by the abnormal voltage condition appears to the voltage source as an increase in capacitance. Alternatively, if the energy supplied to terminal 116 is provided by a different voltage source than that supplying capacitor 114, the capacitive energy flow into capacitor 114 through terminal 20 will be reduced as the energy flow into terminal 116 is increased, and the effective capacity of cable capacitor 114 will be decreased. Thus, it may be seen that the effective capacitance of capacitor 114 may be varied by varying the energy supplied to terminal 116, regardless of whether one common voltage source is used, or two separate voltage sources are used.

DESCRIPTION, AMPLIFIER

The disclosed inventive concept may also be used as an amplifier. FIGURE 18 shows a normal voltage-gradient curve 124 that is produced by using a cable-capacitor of the described type; the shape of curve 124 being determined by the diameter and spacing of the central wire and extrenal sheath, and by the type of material that is used for the insulation. As previously indicated, a control voltage V1 is applied to a voltage-gradient curve 126. In accordance with previous discussions, a voltage-gradient control element at a distance R6 would assume an abnormal voltage of V3, and a normal voltage of V2; the difference being a voltage V4. Thus, a small input voltage V1 produces a large output voltage V4; the device thus acting as a voltage amplifier.

By suitably positioning the control elements, and by controlling the cable parameters, the amount and type of amplification may be controlled.

It can be shown mathematically that an amplification of the type described in connection with FIGURE 18 also involves changes in electrical current. That is, if the current supplied to certain elements is decreased, the current taken by other elements is increased. Thus, the disclosed embodiment may act as a current amplifier, which is a particularly desirable charactertistic in certain electronic circuits, esppecially those using transistors.

DESCRIPTION, IMPEDANCE CONVERTER

It is well known in the art that any combination of circuit elements that alters the ratio of voltage and current in a circuit (regardless of whether or not amplification occurs) constitutes an impedance changing device. As described earlier, this invention can amplify voltage, current, and/or both. Thus, it is axiomatic that the invention can be used as an impedance converter.

What is claimed is:
1. The combination comprising:
 a first electrically-conductive member comprising a longitudinal wire;
 a second electrically-conductive member spaced from said first member, said second member being concentric and circumjacent with respect to said wire;
 an interleaved-layer voltage-control structure positioned between said members, said structure comprising at least two layers of electrically-insulating material and at least one layer of electrically-conductive material positioned between said insulating layers, said interleaved layers comprising tubular configurations positioned concentric and circumjacent with respect to said wire;
 voltage-establishing means, comprising a voltage-producing device electrically connected between said first and second members, for establishing a predetermined electrical voltage at said electrically-conductive layer, said voltage producing device comprising means for varying said predetermined voltage; and
 means, comprising a power-factor measuring device connected between said first and second members, for causing said voltage producing device to vary said predetermined voltage for continually adjusting the power-factor.
2. A closed-loop circuit for controlling the power-factor of a power-line, comprising:
 (I) a cable having
  (A) a longitudinal electrically-conductive first member;
  (B) a longitudinal electrically-conductive second member, said second member being coaxial-with and external-to-said first member; and
  (C) an interleaved-layer control-structure positioned between said members, said structure comprising at least two layers of electrically-insulating material and at least one layer of electrically-conductive material positioned between said insulating layers, said layers being co-axial-with, and circumjacent said first member, said electrically-conductive members and layer being identified as electrically-conductive elements;
 (II) means, electrically connected to said first electrically-conductive member, for measuring the power-factor of said power-line;
 (III) means for varying the effective capacitance between said electrically-conductive elements of said cable, said varying means comprising
  (D) at least one voltage-source having outputs electrically connected to respective electrically-conductive elements of said cable;
  (E) said voltage-source connected to be responsive to the output of said power-factor measuring means;
 (IV) whereby an undesirable power-factor is sensed by said power-factor measuring means, whose output changes the voltage produced by said voltage-source, thus varying the effective capacitances between said electrically-conductive elements, which in turn varies the capacitive current to correct the undesirable power-factor.
3. The combination of claim 2 whereby limitation I comprises a plurality of such cables, limitation II comprises a like plurality of power-factor measuring means electrically-connected to respective said cables, and limitation III comprises a like plurality of voltage-sources electrically-connected to respective cables and respective power-factor measuring means.

References Cited

UNITED STATES PATENTS

| | | | |
|---|---|---|---|
| 1,039,298 | 9/1912 | Kurda | 336—70 X |
| 1,259,384 | 3/1918 | Fortescue | 174—141 |
| 1,266,516 | 5/1918 | Momota | 174—143 |
| 2,231,701 | 2/1941 | Brooks | 317—242 |
| 3,067,394 | 12/1962 | Zimmerman et al. | 307—320 X |
| 3,193,712 | 7/1965 | Harris | 174—143 X |

(Other references on following page)

UNITED STATES PATENTS

| | | | |
|---|---|---|---|
| 3,281,647 | 10/1966 | Hines et al. | 307—320 X |
| 3,377,530 | 4/1968 | Meyers | 317—242 |

FOREIGN PATENTS

| | | |
|---|---|---|
| 742,448 | 12/1932 | France. |
| 21,860 | 1907 | Great Britain. |
| 27,859 | 1908 | Great Britain. |
| 439,457 | 12/1935 | Great Britain. |
| 512,798 | 2/1955 | Italy. |
| 106,023 | 8/1924 | Switzerland. |
| 126,484 | 6/1928 | Switzerland. |

LARAMIE E. ASKIN, Primary Examiner

U.S. Cl. X.R.

174—105, 143; 307—147; 317—242; 324—86; 330—7